Nov. 24, 1925.  W. L. WHALLON  1,563,055
BAGGAGE CARRIER
Filed Jan. 3, 1924
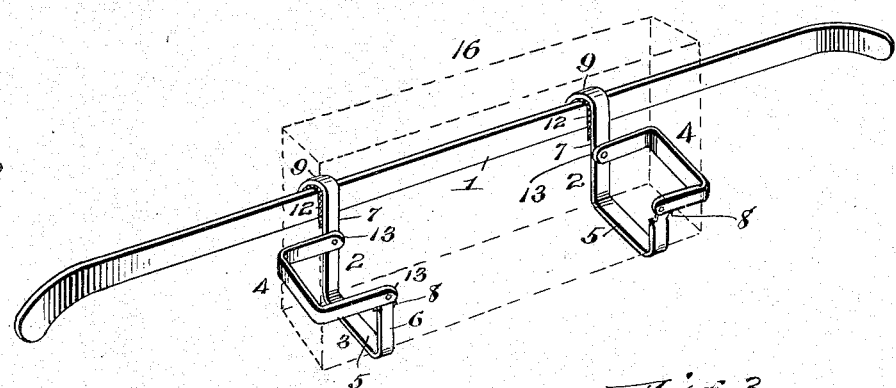
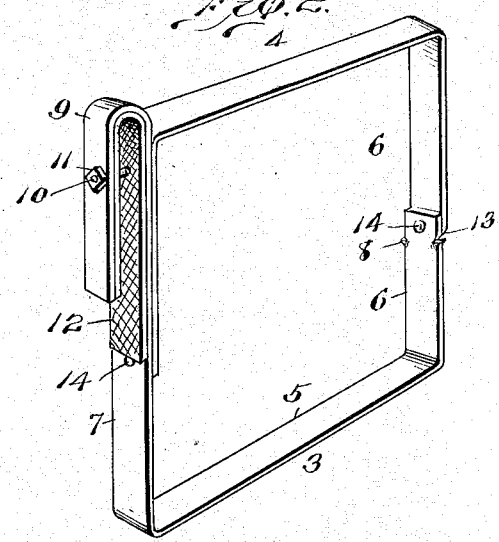
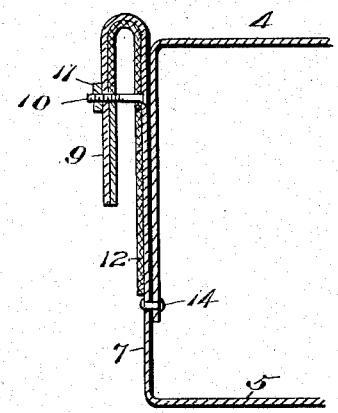
Inventor
Walter L. Whallon
By Ernest E Harmon Attorney Patented Nov. 24, 1925.

1,563,055

UNITED STATES PATENT OFFICE.

WALTER L. WHALLON, OF ZANESVILLE, OHIO.

BAGGAGE CARRIER.

Application filed January 3, 1924. Serial No. 684,203.

*To all whom it may concern:*

Be it known that I, WALTER L. WHALLON, a citizen of the United States, residing at Zanesville, in the county of Muskingum and State of Ohio, have invented certain new and useful Improvements in Baggage Carriers, of which the following is a specification.

This invention relates in general to baggage carriers for use on automotive vehicles and more particularly to a baggage carrier adapted to be carried by the bumper of such a vehicle.

Most of the baggage carriers with which I am familiar are adapted to be carried on the running boards of the vehicle. Naturally such an arrangement greatly interferes with the opening of the doors of the vehicle and with the entrance and discharge of passengers. Additionally the baggage so carried is likely to scratch the paint of the vehicle.

It is an object of my invention to provide a baggage carrier which is adapted to be carried solely by bumper of the vehicle.

It is a further object of my invention to provide a baggage carrier of exceedingly simple construction which may be quickly attached to or removed from the bumper, and which, when not in use, is collapsible to occupy the minimum of space.

Other objects and advantages of my invention will be found in the accompanying specification and claims and will be disclosed in the accompanying drawings, in which—

Figure 1 is a perspective view of my device as applied to an automotive vehicle bumper;

Figure 2 is a perspective view of one of the parts of my baggage carrier;

Figure 3 is a side elevation, in section, of the device shown in Figure 2.

Referring with greater particularity to the drawings it will be seen that my device is comprised as follows:

A pair of supporting members 2 are adapted to be attached in spaced relation to the bumper 1 of an automotive vehicle, which bumper forms their sole support. The members 1, which are formed of any suitable metal, are identical in structure and are therefore interchangeable. Each of the members 2 is comprised of two parts 3 and 4. The part 3 is formed of a suitable metal strip having a base portion 5 and side portions 6 and 7 of unequal lengths. The shorter side 6 near its upper end is provided with ears 8 which are formed by cutting diagonally into the side of the metal strip and bending the ears outwardly. The utility of the ears 8 will be described hereinafter.

The longer arm 7 is bent over to form a hook 9 which is adapted to straddle the bumper 1 to which it is fixedly secured by any suitable means, such as the rivet or bolt 10, the shank of which is screw-threaded for the reception of nut 11. A liner 12 of felt or some such material is secured in any suitable manner, such as by gluing, to the hook portion of this arm to prevent rattling of the baggage carrier and scarring of the bumper.

The member 4 is substantially U-shaped and has its ends rounded as at 13. The member 4 is revolubly secured adjacent its ends to the member 3 by any suitable means such as rivets 14. It will be noted that the rounded ends 13 of the arm 4 permit the arm ends to move between the ears 8 and thus the arm may be rotated from the position shown in Figure 2 ninety degrees in either direction as shown in Figure 1. The side of the arm will then contact with the ears 8 and prevent further rotation in that direction.

My device having been described in detail, its operation will be seen to be as follows: When the device is not in use it can be collapsed as shown in Figure 2, removed from the bumper, and, by reason of its shape stored in the minimum of space under the seat of the vehicle. When it is to be used it is merely necessary to attach the two members to the bumper, turn the arms 4 into the position shown in Figure 1 and the baggage 16 placed in position.

It will be seen that the device above disclosed is of exceeding few parts and great economy of manufacture and assembly, that is, can be easily attached to or detached from the vehicle, that it is capable of storage in a minimum of space when not in use, and that provision has been made to mount it in such a manner as to offer the least possible inconvenience to the passengers of the vehicle and the least damage to the vehicle.

I claim:—

1. A luggage carrier for motor vehicle bumpers embodying a pair of supporting appliances each embodying a stirrup-shaped member one of whose vertical bars is provided with a hook adapted to engage slidingly over the bumper bar to thus suspend the two stirrups in horizontal alinement on the bumper-bar, each stirrup being provided with a retaining-loop of stirrup shape having its ends pivoted on a horizontal axis to the aforesaid upright members of the hanger-stirrup, these retaining-loops being adapted to be swung to horizontal position toward either side and to be arranged, when not in use, in alinement with the hanger-stirrup, for the purposes set forth.

2. A luggage carrier for motor vehicle bumpers embodying a pair of supporting appliances each embodying a stirrup-shaped member one of whose vertical bars is provided with a hook adapted to engage slidingly over the bumper-bar to thus suspend the two stirrups in horizontal alinement on the bumper-bar, each stirrup being provided with a retaining-loop of stirrup shape having its ends pivoted on a horizontal axis to the aforesaid upright members of the hanger-stirrup, these retaining-loops being adapted to be swung to approximately horizontal position toward either side and to be arranged, when not in use, in alinement with the hanger-stirrup, stops being provided to limit the movement of the stirrups in either direction for the purposes set forth.

3. In an adjustable baggage carrier for use on automotive vehicles, a pair of spaced supporting members comprising a strip of metal bent into a substantially unequaled armed U-shaped member, the longer arm of said U-shaped member being bent to form a hook shaped portion for securing said member to the bumper of said vehicle, and U-shaped end members rotatably secured to said supporting members. said supporting member having a portion thereof cut and bent to limit the rotative movement of said end members in either direction beyond the horizontal.

In testimony whereof I affix my signature.

WALTER L. WHALLON.